US009656549B2

(12) United States Patent
Nett et al.

(10) Patent No.: US 9,656,549 B2
(45) Date of Patent: May 23, 2017

(54) EQUALIZING UNIT OF A DRIVE TRAIN OF A MOTOR VEHICLE AND ITS CONSTRUCTION FOR LOSS-MINIMIZING OILING ON DEMAND

(71) Applicant: GKN Driveline Koping AB, Koping (SE)

(72) Inventors: Hans-Peter Nett, Adenau (DE); Christoph Gottert, Cologne (DE); Michael Kammerer, Bergisch-Gladbach (DE); Jan Haupt, Kurten (DE)

(73) Assignee: GKN Driveline Koping AB, Koping (SE)

( * ) Notice: Subject to any disclaimer, the term of this patent is extended or adjusted under 35 U.S.C. 154(b) by 0 days.

(21) Appl. No.: 14/466,331

(22) Filed: Aug. 22, 2014

(65) Prior Publication Data
US 2014/0360291 A1     Dec. 11, 2014

Related U.S. Application Data

(63) Continuation of application No. 13/195,082, filed on Aug. 1, 2011, now Pat. No. 8,845,473.

(30) Foreign Application Priority Data

Aug. 3, 2010     (DE) .................... 10 2010 036 826

(51) Int. Cl.
*B60K 25/06*     (2006.01)
*F16H 57/04*     (2010.01)
(Continued)

(52) U.S. Cl.
CPC .......... *B60K 25/06* (2013.01); *F16H 57/0409* (2013.01); *F16H 57/0423* (2013.01);
(Continued)

(58) Field of Classification Search
CPC ...... B60K 23/08; B60K 17/34; B60K 17/346; B60K 17/3462; F16H 57/0409; F16H 57/0473; F16H 57/0457
(Continued)

(56) References Cited

U.S. PATENT DOCUMENTS 1,380,584 A     6/1921  Parker
2,930,460 A *   3/1960  Isaacson .................... 192/18 R
(Continued)

FOREIGN PATENT DOCUMENTS

DE     19800328     7/1998
DE     102006034153     1/2008
(Continued)

OTHER PUBLICATIONS

European Search Report dated Sep. 9, 2014 (2 pages).

*Primary Examiner* — Colby M Hansen
(74) *Attorney, Agent, or Firm* — Bejin Bieneman PLC

(57) ABSTRACT

An equalizing unit of a drive train of a motor vehicle includes a clutch device to be oiled in driving mode. In order to stop drag torques which act on the clutch device from the outside, and result in increased dissipation when said clutch device is not required due to an operating state, measures are provided which promote the dry running of the clutch device. The measures include the spatial-functional separation of the oil delivery device from the clutch device and the provision of a braking or decoupling device by which the oil delivery device can be deactivated if there is no oil requirement.

19 Claims, 3 Drawing Sheets

Detail A

(51) Int. Cl.
*B60K 17/34* (2006.01)
*F16H 48/19* (2012.01)
*F16H 48/38* (2012.01)

(52) U.S. Cl.
CPC ..... *F16H 57/0427* (2013.01); *F16H 57/0457* (2013.01); *F16H 57/0473* (2013.01); *F16H 57/0483* (2013.01); *B60K 17/34* (2013.01); *F16H 48/19* (2013.01); *F16H 57/0424* (2013.01); *F16H 57/0471* (2013.01); *F16H 2048/385* (2013.01)

(58) Field of Classification Search
USPC ..... 192/14, 18 R, 53.34; 180/244, 245, 246; 475/160, 230
See application file for complete search history.

(56) References Cited

U.S. PATENT DOCUMENTS

| | | | |
|---|---|---|---|
| 3,741,343 A | 6/1973 | Lindenfeld et al. | |
| 4,294,338 A * | 10/1981 | Simmons | F16D 23/06 188/72.1 |
| 4,901,598 A | 2/1990 | Batchelor et al. | |
| 5,381,878 A * | 1/1995 | Ohshima | F16D 23/02 192/114 T |
| 5,651,435 A * | 7/1997 | Perosky | F16D 23/06 192/219 |
| 6,152,848 A * | 11/2000 | Williams et al. | 475/204 |
| 6,244,404 B1 * | 6/2001 | Kim | F16D 23/06 192/53.32 |
| 8,739,905 B1 * | 6/2014 | Bennett | B60K 17/28 180/364 |
| 2004/0224809 A1 | 11/2004 | Hayes et al. | |
| 2009/0235781 A1 | 9/2009 | Quehenberger et al. | |
| 2010/0101351 A1 | 4/2010 | Lafer et al. | |
| 2012/0031727 A1 | 2/2012 | Nett et al. | |

FOREIGN PATENT DOCUMENTS

| | | |
|---|---|---|
| DE | 102007022182 | 11/2008 |
| DE | 102008000777 | 9/2009 |
| DE | 102008000777 A1 | 9/2009 |
| DE | 102008015200 | 9/2009 |
| DE | 102008001889 | 11/2009 |
| DE | 102008002844 | 11/2009 |
| EP | 0875690 | 4/1998 |
| EP | 0850797 A1 | 7/1998 |
| EP | 1916448 A2 | 4/2008 |
| EP | 2161155 A2 | 3/2010 |
| GB | 2 277 358 | * 10/1994 |
| GB | 2455198 | 3/2009 |

* cited by examiner

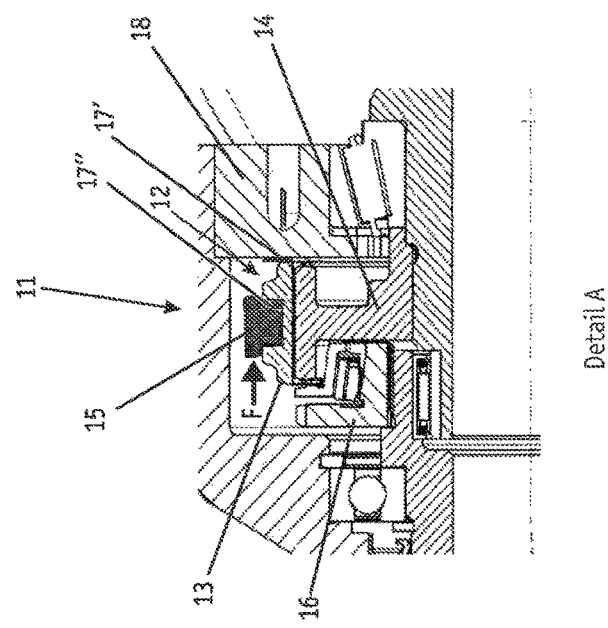
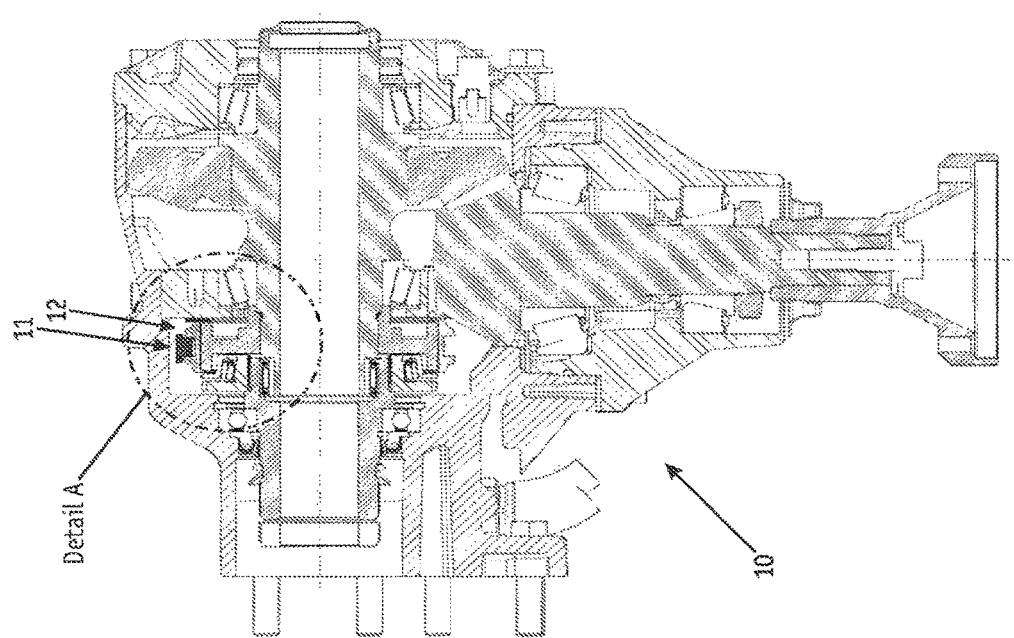
Fig. 5
Fig. 4

EQUALIZING UNIT OF A DRIVE TRAIN OF A MOTOR VEHICLE AND ITS CONSTRUCTION FOR LOSS-MINIMIZING OILING ON DEMAND

CROSS-REFERENCE TO RELATED PATENT APPLICATIONS

This application is a continuation of U.S. patent application Ser. No. 13/195,082 filed on Aug. 1, 2011, which is based upon and claims the benefit of priority from prior German Patent Application No. 10 2010 036 826.1, filed Aug. 3, 2010, the entire contents of said applications are incorporated herein by reference in their entirety.

BACKGROUND

An equalizing unit of a drive train of a motor vehicle with a housing and with drive members comprises an input shaft and at least one first output shaft. The first output shaft can be coupled to a second output shaft or to the input shaft or to an intermediate shaft driven by the input shaft via a clutch device, which is to be supplied with oil via a delivery device directly or indirectly driven via the drive members.

The construction of an equalizing unit described above is known from German publication DE 10 2008 002 844 A1. There, a drive train for a motor vehicle is shown, including a transverse equalizing unit without differential wherein the output shafts for driving the drive wheels are driven via two individually activatable side shaft clutches. The side shaft clutches are formed by disc packages which for cooling and lubrication have to be oiled. The outer discs of the disc package are connected in a rotationally fixed manner to an intermediate shaft driven by the input shaft—in DE 10 2008 002 844 A1 this is the crown wheel carrier shaft—and through their special configuration deliver the oil to the outside into an oil collection pocket provided in the housing, from where the oil via housing bores flows back to the interior of the disc package where it is again collected by the discs so that—based on a disc package of a side shaft clutch—an internal oil circuit is formed.

Because of this internal oil circuit a large part of the oil volume expended for the cooling and lubrication remains in the described internal oil circuit for a long time without the oil volume being sufficiently mixed with "fresh" oil or replaced with such. Oil volume, which has only just absorbed heat between the clutch discs, is directly returned to the discs again. The clutch temperature therefore rises disproportionally to the cooling output that could be achieved with the oil quantity present in the equalizing unit. The disproportionate heating of the clutch brings disadvantages with regard to wear characteristics and thus the lifespan, and also is problematic with regard to response and control behavior.

A further disadvantage of the equalizing unit shown in DE 10 2008 002 844 A1 is that the clutch packages of the side shaft clutches stand in the oil in order to collect it and deliver it to the oil collection pocket. The concomitant splashing losses increase the dissipation of the drive train.

In addition to undesirable dissipation, even in the case described in DE 10 2008 002 844 A1 where the secondary part of the drive train is decoupled from the drive wheels and the side shaft clutches are fully opened, the secondary drive wheels roll on the street in driving mode and drag the inner disc carrier and the inner discs connected with the latter in a rotationally fixed manner. The inner discs, however, are in permanent contact with the oil since they are immersed in it. Not only the region of the extremely narrow air gap (gap width approximately 0.1 mm) between inner and outer discs which is directly located in the oil is filled with oil, but the oil is additionally delivered through the rotating inner discs into the intermediate space between inner and outer discs of the disc clutch which do not stand in the oil. The fluid friction or hydrodynamic friction created as a consequence in turn transmits drag torque, acting from the secondary drive wheels, to the inner discs, and then to the outer discs, and because of this the friction drives the outer discs. However, as soon as these start to rotate these in turn deliver oil into the previously described internal oil circuit and on their part thus again increase the delivered oil volume and thus the friction loss or dissipation. The undesirable effect amplifies itself.

Tests have shown that because of this effect the secondary drive train, contrary to the assumptions made in DE 10 2008 002 844 A1, does not come to a halt even when it is decoupled from the primary part of the drive train. Through the low-friction configuration of the surfaces of the inner discs proposed in DE 10 2008 002 844 A1, the negative consequences of this effect can only be reduced to a very minor degree. In addition, the low-friction surfaces of the inner discs result in a significantly poorer response and control behavior of the clutch package.

SUMMARY OF PREFERRED EMBODIMENTS

As disclosed herein, the oiling concept described in DE 10 2008 002 844 A1 may be optimized with regard to the dissipation caused upon a secondary part decoupled from the primary part of the drive train without having to accept compromises with the response and control behavior of the clutch packages.

For example a delivery device may be formed by an oil delivery wheel arranged distant from the clutch device.

The arrangement of the oil delivery wheel distant from the clutch device results in the oil following a passage through the clutch device to be oiled always flowing back into the oil sump of the equalizing unit before it is again fed into the oil circuit. Thus, adequate mixing-through of the entire oil volume, and consequently the utilization of the maximum cooling output of the total oil quantity, is guaranteed at all times, which in turn reduces thermal loading of the clutch devices.

The equalizing gear can be both a transverse as well as a longitudinal equalizing unit. For example, a transverse equalizing unit may act in a purely frictionally connected manner without a differential, wherein the side shafts of the drive wheels are coupled into the drive power flow via side shaft clutches, as is already shown in DE 10 2008 002 844. In principle, conventional longitudinal and transverse differentials may be employed acting in a positively connected manner in order to oil clutch packages of the differential locks, be it in shaft-shaft arrangement or in shaft-cage arrangement. The intermediate shaft with a conventional differential is formed by the differential cage.

The mentioned configuration additionally makes possible designing the oil delivery wheel in such a manner that it is able to deliver the cooling and lubricating oil from an oil sump with an oil level located below the clutch device. The clutch device for example, dragged clutch components, can thus be permanently located above the oil level. Even the outer disc carrier located radially outside, and the outer discs, do not cause any splashing losses either under load, that is, for example, with a connected secondary part of the drive train, nor in the opened mode, that is with a disconnected secondary part.

The oil delivery wheel may be formed by a crown wheel arranged on the intermediate shaft, via which, as part of the angular gear, the drive power introduced by the input shaft is transmitted to the intermediate shaft. If, because of the dimensioning of the crown wheel, the crown wheel itself does not have an adequate diameter for immersing itself in an oil sump even located below the clutch device, the oil delivery wheel can comprise the crown wheel arranged on the intermediate shaft, wherein the crown wheel is radially expanded to the outside by an oil delivery ring. The oil delivery ring can be designed as integral material-unitary part of the crown wheel. For weight and cost reasons, and in order to keep masses to be accelerated and decelerated low, the oil delivery ring may be produced as a separate component from a lighter material and may be joined, e.g., screwed, to the crown wheel.

Realizing the oil delivery wheel with the help of a gear wheel of the equalizing gear standing in the power flow is not absolutely essential. An oil delivery wheel that is separate from the crown wheel can also be provided on the input shaft or the intermediate shaft.

In order to increase the oil flow, at least part-circumferential bulkheads can be provided which minimize the lateral outflow of the oil taken along by the oil delivery wheel.

In addition to the improvement measures described above, it has been shown that the oiling concept can be optimized further still. The self-amplifying effect of an undesirable clutch oiling caused through drag torques of wheels that are not driven but are rolling on the road, despite a decoupled secondary part of the drive train, was observed during tests despite the remedial measures described above.

At a torque at which the clutch device is opened for decoupling the secondary part from the primary part of the drive train, oil continues to be delivered by the rotating oil delivery wheel, because of a running-down due to mass inertia, among other reasons. In addition, oil is remains present between the two clutch sides despite opened clutches, so that the clutch, although it is in the open state, transmits a drag power from the one clutch side to the other clutch side. The latter clutch side as drive member of the secondary part of the drive train in turn drives the oil delivery wheel, which consequently does not completely cease the oil delivery as actually desired, but continues to deliver oil to the clutch device. As a consequence of the non-interrupted oil flow, and supported by the drag power introduced via the drag torque, a state of equilibrium is established which prevents a complete stoppage of the drive members of the secondary part of the drive train. The secondary part continuously co-rotates and causes dissipation although it is not integrated in the drive power flow.

In order to interrupt this equilibrium, a braking or decoupling device is provided, by which the oil delivery wheel can be stopped when there is no oiling need for the clutch device. With such a braking or decoupling device, the state of equilibrium which would otherwise materialize can be effectively prevented. Depending on where and how the braking or decoupling device intervenes, the drag power can no longer be transmitted from a first clutch side to a second clutch side because the first clutch side is already braked, and/or because, through the decoupling of the oil delivery wheel from its drive member, the drag power is not transmitted to the oil delivery wheel. However, as soon as the oil delivery wheel is stationary, the oil flow is interrupted and the undesired oiling in the drag state is terminated. The clutch device briskly runs dry and the two clutch sides rotate with significantly lower loss.

Because the braking torque, which the braking device has to provide for stopping the oil delivery wheel, is small, the braking device can also be realized with the help of smaller drive train components of the secondary part. For example, the braking device can comprise the sliding sleeve of a synchronizing device that interacts with a fixed part of the motor vehicle via a friction surface, and that is capable of generating a braking torque for braking the drive members of the secondary part to be stopped. Here, the sliding sleeve for generating the frictional torque can support itself, for example against a bearing block or another component that is capable of supporting the braking torque. Alternatively or additionally, the sliding sleeve for creating the frictional torque can comprise a friction surface facing a shifting fork of the synchronizing device.

Stopping the oil delivery device through a braking or decoupling device be realized not only with oil delivery devices which are formed by an oil delivery wheel. Other oil delivery devices can be employed delivering oil to the clutch device by other mechanisms.

Accordingly, the drive train can comprise an equalizing gear with drive members comprising an input shaft and at least one first output shaft, wherein the first output shaft can be coupled to a second output shaft or to the input shaft, or to an intermediate member driven by the input shaft, via a clutch device to be oiled. The clutch device can be supplied with oil via a delivery device directly or indirectly driven via the drive members. In the drive train a braking or decoupling device is provided, by which the delivery device can be stopped if there is no oiling need for the clutch device.

The previously described braking device can act not only on drive members of the equalizing unit. For example, a drive train can have a permanently driven primary part for the permanent driving of primary drive wheels as well as a secondary part for the driving of secondary drive wheels. The secondary part if required can be decoupled from the primary part and the secondary drive wheels or connected to these; the braking device can act on any parts of the secondary part of the drive train.

The braking device thus need not necessarily be part of the equalizing unit, it merely needs to generate an adequate frictional torque somewhere in the secondary part of the drive train to be effective for the secondary part to be deactivated.

Accordingly, the drive train can comprise a permanently driven primary part for the permanent driving of primary drive wheels and a secondary part for the driving of secondary drive wheels, wherein the secondary part if required can be decoupled from the primary part and the secondary drive wheels. However, the secondary part may be connected to these. Further, in the secondary part at least one clutch device may be provided. At least one clutch side of the clutch device is dragged via the secondary axle drive wheels which roll during operation of the vehicle even with the secondary part decoupled and to be supplied with oil via a delivery device directly or indirectly driven via drive members of the secondary part, wherein a braking device is provided by which the secondary part can be braked in the state decoupled from the primary part.

In summary a revised oiling concept of an equalizing unit of a drive train of a motor vehicle with a clutch device to be oiled in driving mode and measures connected with this is disclosed. In order to stop drag torques which act on the clutch device from the outside and lead to increased dissipation when said clutch device is not required due to the operating state, measures are provided which promote the dry-running of the clutch device. The measures include the spatial-functional separation of the oil delivery device from the clutch device and the provision of a braking or decoupling device, by which the oil delivery device can be deactivated when no oil is required.

DESCRIPTION OF THE DRAWINGS

Further features and advantages are obtained from the subclaims and from the following description of exemplary embodiments by means of the drawings.

In the drawings:

FIG. 4 is a power takeoff unit (PTU) provided for a drive train according to FIG. 1 with an additional braking device for braking the secondary part of the drive train.

FIG. 5 is a detailed view of a braking device and a synchronizing device.

DETAILED DESCRIPTION OF PREFERRED EMBODIMENTS

Figure 1:
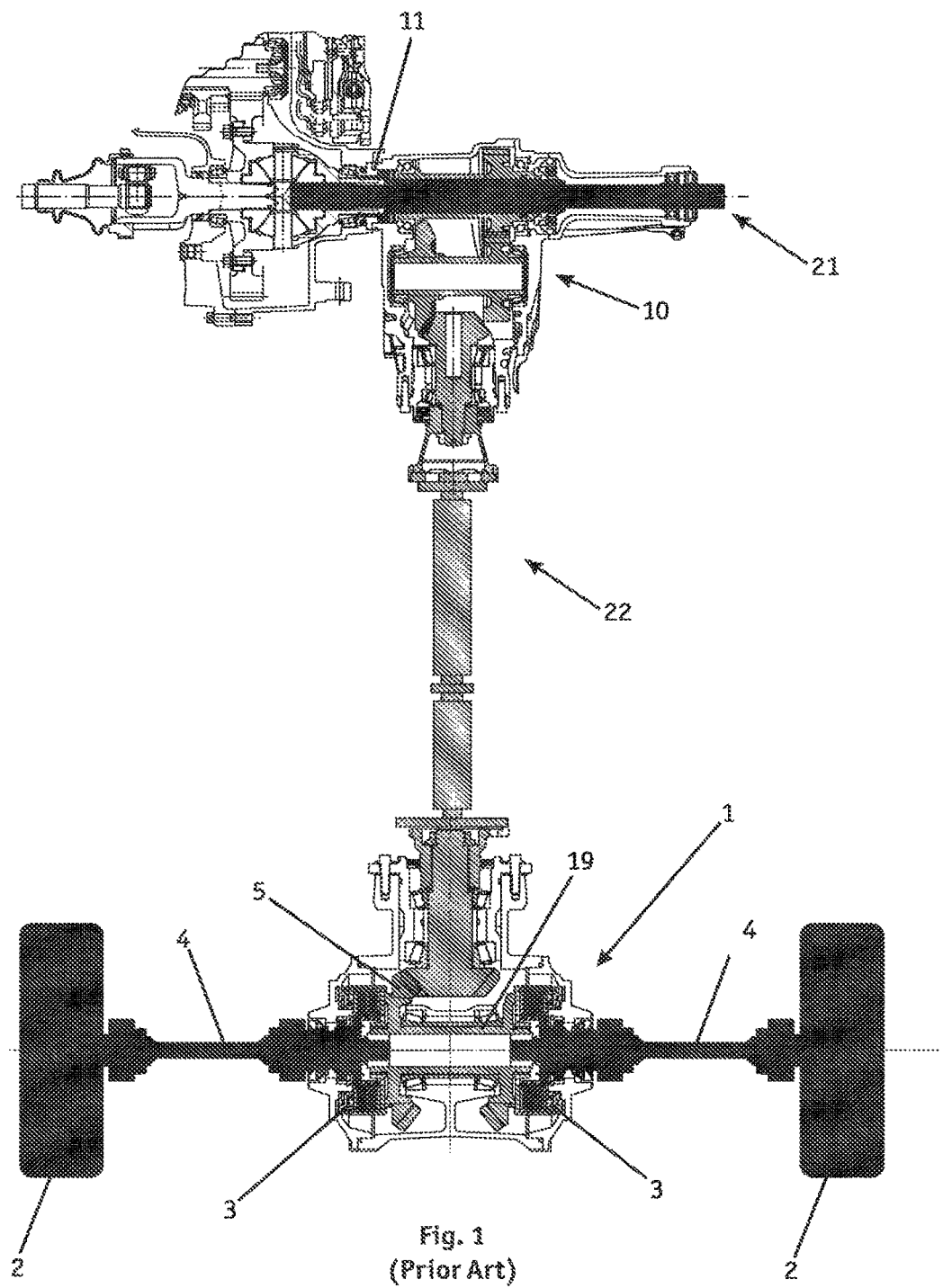
FIG. 1 is a drive train construction known from the prior art with a permanently driven primary part and a secondary part that can be connected when required with a equalizing unit without differential for driving the secondary drive wheels.

FIG. 1 shows a drive train construction known from the prior art with a permanently driven primary part 21 and a secondary part 22 only driven when required with an equalizing unit 1 without a differential for driving the secondary drive wheels 2. The secondary part 22 of the drive train, whose drive members can be decoupled from or connected to the primary part 21 depending on requirement, is shown obliquely hatched, while those drive members, which interact with the secondary part 22 in driving mode for power transmission and rotate permanently are marked black throughout.

The equalizing unit 1 is an equalizing unit without a differential, wherein power flow is transmitted to the secondary drive wheels 2 via two individually activatable clutch devices formed through side shaft clutches 3, and via the half shafts 4. Here, the side shaft clutches 3, which are formed by disc clutches acting in a frictionally connected manner not only compensate for the different rolling paths of the secondary axle drive wheels 2 when driving through curves but are also utilized for actively influencing the dynamic driving behavior. In operation, the clutches have to be oiled with cooling and lubricating oil.

Tests with the system shown in FIG. 1 have shown that even when the secondary part 22 of the drive train is decoupled from the primary part 21, particularly when said secondary part 22 is decoupled while driving at a speed at or greater than approximately 50 km/h, the drive members of the secondary part 22 do not stand still as desired, but continue to rotate through the drag power introduced into the side shaft clutches 3 by the secondary drive wheels 2, and thus cause dissipation. The reason for this is particularly the oiling concept selected in the prior art as described at the outset.

Figure 2:
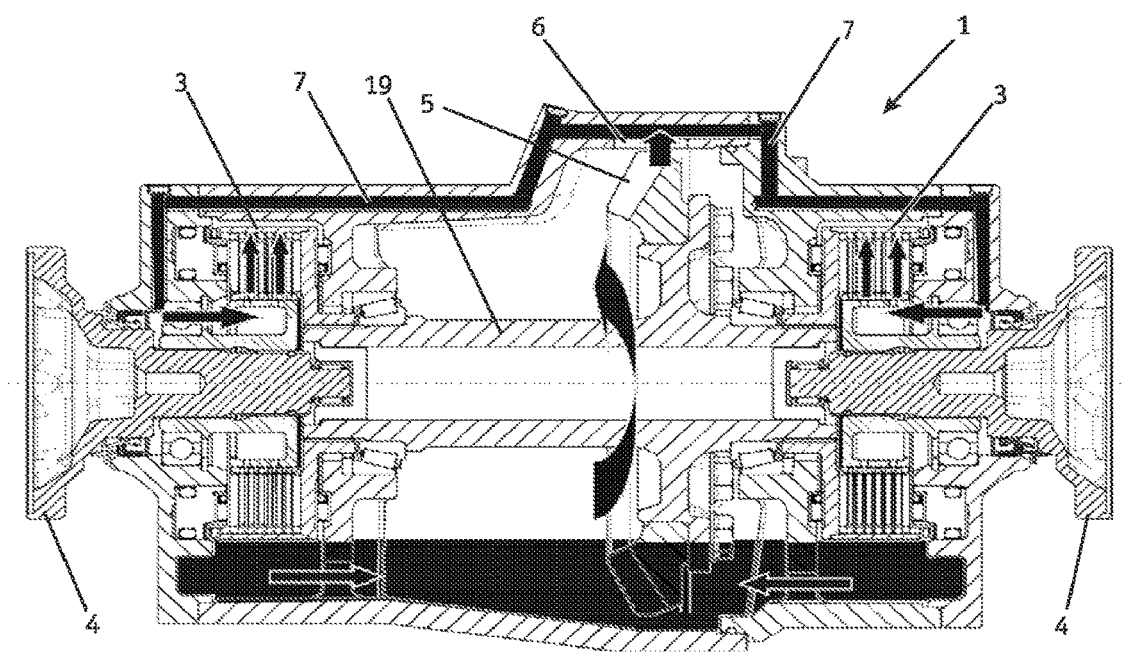
FIG. 2 is an equalizing unit without a differential during operation with an oil delivery wheel formed by a crown wheel for clutch oiling.

FIG. 2 shows an equalizing unit 1 without a differential during the operation with an oil delivery wheel for clutch oiling formed by the crown wheel 5. The crown wheel 5 because of its rotation scoops the oil along the housing inner wall to an oil collection pocket 6 provided in the housing. From there it reaches the side shaft clutches 3 via oil feed channels 7. The crown wheel 5 is arranged on the intermediate shaft 19 and is driven via an input shaft (not shown).

By utilizing the crown wheel 5 as oil delivery wheel or bucket wheel it is ensured, compared with a solution where the discs of the side shaft clutches predominantly deliver the oil, that the oil flowing back from the clutches—before it is again fed to the oil circuit—collects in the oil sump and is mixed with the entire oil volume. It is prevented that an inner oil circuit forms, because of which the oil after it has flowed through the clutches is directly fed back to the clutches again so that the oil in consequence would be heated up disproportionately.

Figure 3:
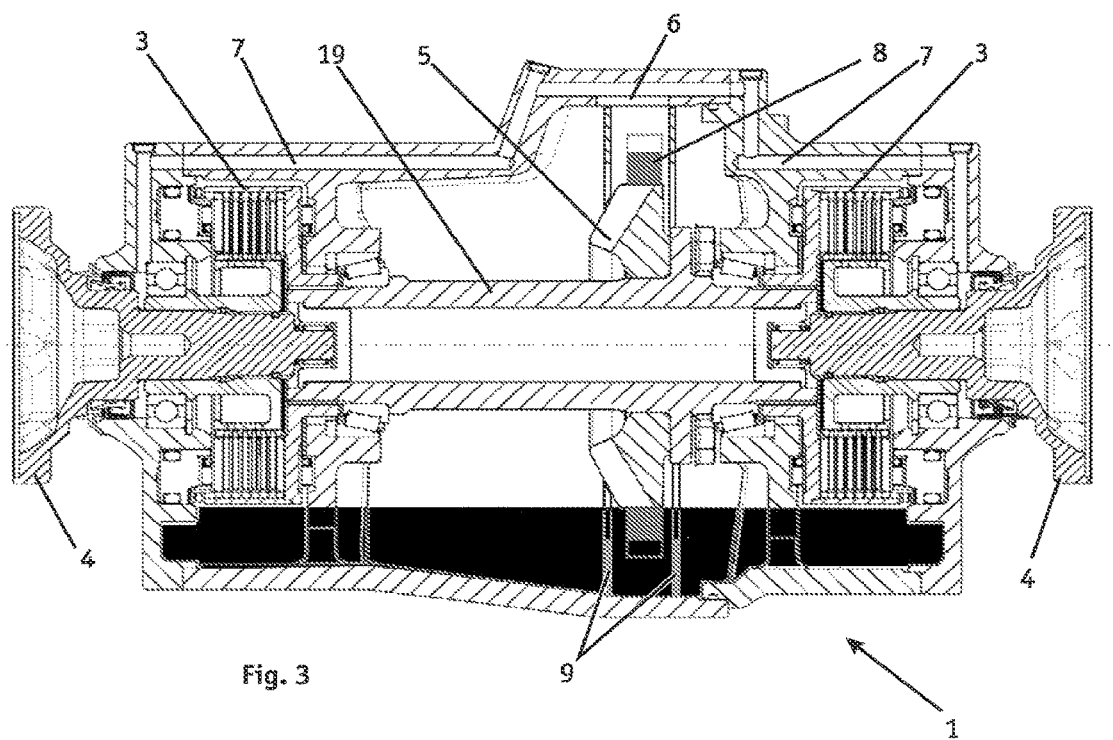
FIG. 3 is an alternative embodiment of the equalizing unit without differential in the stationary state with a schematically represented oil delivery ring fastened to the crown wheel.

FIG. 3 shows the equalizing unit from FIG. 2, wherein in the example of FIG. 3 the equalizing unit is stationary. The diameter of the crown wheel 5 is not adequate to immerse itself in the oil. For this reason, an only schematically represented oil delivery ring is provided on the crown wheel 5, which radially expands the active diameter of the crown wheel 5 with respect to the oil delivery capability. The oil delivery ring 8 need not necessarily be a ring-shaped component but individual non-continuous blades can also be arranged on the crown wheel 5 which are distributed over its circumference.

Likewise only schematically shown is a part-circumferential oil bulkhead 9, which prevents the oil during the delivery process from laterally flowing out of the oil sump to the oil collection pocket located above due to centrifugal force. The application of a bulkhead 9 can be used not only with an oil delivery ring, but also in a configuration according to FIG. 2 or for other arrangements of oil delivery wheels on the intermediate shaft. The bulkhead 9 may be provided on both sides of the oil delivery wheel and can either be formed by a part to be separately inserted or directly by a projection protruding to the inside or a rib of the housing, wherein installation space and installation aspects obviously have to be taken into account.

In addition as can be seen in FIG. 2 and FIG. 3, the oil level in the oil sump both in the operating state as well as when stationary is located below the side shaft clutches 3. This also contributes to minimizing the dissipation since the clutch members dragged by the half shafts 4 do not stand in the oil and can thus not deliver any oil between the clutch discs. When the secondary part 22 of the drive train is decoupled from the primary part 21 the clutches 3 can thus run in a completely dry and thus low-friction manner.

Despite the spatial-functional separation of clutch device and oil delivery device it can happen, as described at the outset, that the secondary part 22 of the drive train, after separation from the primary part 21 particularly as a consequence of the continuing running down of oil in the clutch device, continues to rotate and causes dissipation. In order to stop this, and, to make it possible that the oil flow can be completely stopped, a braking device is provided which in the following is explained exemplarily by means of a special configuration of the power takeoff unit 10 (PTU) shown in FIG. 1.

So as to make it possible that the secondary part 22 of the drive train shown in FIG. 1 can also be connected to or decoupled from the drive train even while driving, the PTU 10 has a synchronizing device 11. FIG. 4 shows a PTU 10 that can be employed in a drive train according to FIG. 1 with an additional braking device 12 for braking the secondary part 22 of the drive train, wherein the braking device 12 is provided on the synchronizing device 11. FIG. 5 provides a detailed view of the devices 11, 12.

The synchronizing device 11 comprises a sliding sleeve 13 which is slid onto a guide sleeve 14 in a rotationally fixed but axially displaceable manner. A shifting fork 15, by which the sliding sleeve 13 can be actuated, rests in the sliding sleeve 13. In FIG. 4 the sliding sleeve 13 is shown in a position in which the secondary part 22 of the drive train is decoupled from the primary part 21. In order to connect the secondary part 22 of the drive train to the primary part 21, the sliding sleeve in FIG. 4 therefore would have to be shifted to the left in order to come into engagement with the driver ring 16.

Laterally, next to the sliding sleeve 13, a schematically shown additional friction surface 17' is provided, which interacts with a fixed component capable of supporting a braking torque (for example a bearing block 18). The friction surface is preferably arranged on the sliding sleeve 13 but can just as well be additionally or alternatively provided on the fixed component.

A further friction surface 17" can act between sliding sleeve 13 and shifting fork 15 additionally or alternatively to the friction surface 17'. Here, too, the friction surface 17" can be provided on one of the two or on both components.

If the secondary part 22 of the drive train is now decoupled from the primary part 21 by sliding the synchronizing device into the position shown in FIGS. 4 and 5, a frictional torque can be created in that the sliding sleeve 13 and the shifting fork 15 respectively are specifically set against the friction surfaces 17' and 17" respectively, through which the drive members of the secondary part 22 of the drive train are braked. This interrupts the oil flow in the equalizing unit shown in FIGS. 2 and 3 so that the clutches can run dry and the transmission of the drag torque from the secondary drive wheels via the half shafts into the secondary part-sided clutch device is significantly minimized. The clutch discs subsequently run in an extremely low-friction manner, the secondary part 22 of the drive train stands still.

The synchronizing device 11 shown in FIGS. 4 and 5 is additionally particularly low in friction because of its special arrangement. While usually the guide sleeve 14 is positioned on the permanently rotating drive members of the primary part 21 of the drive train, and the driver ring 16 is located on the drive members of the secondary part 22 of the drive train to be accelerated during the synchronizing process, this is exactly the opposite in the example of FIG. 4. When the secondary part 22 of the drive train is decoupled and stationary, the guide sleeve 14 and the sliding sleeve 13 also stand still so that between shifting fork 15 and sliding sleeve no friction, and thus no dissipation, can occur. In addition, only this configuration makes possible braking the secondary part 22 of the drive train via the synchronizing device, since no braking torque acting on the drive members of the secondary part 22 of the drive train could otherwise be generated via the sliding sleeve 13 or the shifting fork 15. This arrangement of the components of the synchronizing device is an additional conceptive independent of the oiling concept and the remaining construction of the drive train.

The invention claimed is:

1. A powertrain of a vehicle including a permanently powered primary part and a secondary part for powering secondary powered wheels, the powertrain comprising:
    a power takeoff unit (PTU) for connecting and decoupling the primary part and the secondary part;
    a transverse equalizing unit spaced from the power takeoff unit; and
    a drive shaft extending from the power takeoff unit to the transverse equalizing unit;
    the transverse equalizing unit being transverse to the drive shaft and powering the secondary powered wheels with at least one clutch device for decoupling or connecting the secondary powered wheels to the secondary part;
    the power takeoff unit (PTU) comprising:
    a first member configured to be engaged with and permanently powered by the primary part;
    a second member connectable and disconnectable with the first member;
    wherein the first and second member are configured to be connected to each other in a connect mode and transmit rotation from the primary part to the secondary powered wheels via the power takeoff unit as a result of the second member being connected to the first member in the connect mode; and
    wherein the first and second member are configured to be disconnected from each other in a disconnect mode so that no rotation can be transmitted from the primary part to the secondary wheels as a result of the second member being disconnected from the first member in the disconnect mode;
    a braking device engaged with the second member when the second member is in the disconnect mode and configured to brake the secondary part when engaged with the second member so that the secondary part stands still when decoupled from the secondary powered wheels via the clutch device and when the second member is in the disconnect mode.

2. The powertrain as set forth in claim 1 with the powertrain unit further comprising a synchronizing device engaged with the second member and movable between a position disengaged with the first member and a position engaged with the first member.

3. The powertrain as set forth in claim 2 wherein the braking device includes a sliding sleeve of the synchronizing device and contacts a fixed part through a striking surface to create a braking torque for the deceleration of the second member.

4. The powertrain as set forth in claim 3 wherein the sliding sleeve braces against a selector fork of the synchronizing device for the creation of frictional torque.

5. The powertrain as set forth in claim 3 wherein the fixed part is a bearing block.

6. The powertrain as set forth in claim 1 wherein the first member is a ring and the second member is a guide sleeve.

7. The powertrain as set forth in claim 1 further comprising:
    a synchronizing device engaged with the second member and movable between a position disengaged with the first member and a position engaged with the first member, thereby disconnecting and connecting the first member and the second member; and
    a friction surface between the synchronizing device and a rotationally fixed component, the friction surface configured brake the secondary part when the synchronizing device is disengaged with the first member.

8. The powertrain as set forth in claim 7 wherein the synchronizing device includes a sliding sleeve slideably supported on the second member for slideably engaging the first member.

9. The powertrain as set forth in claim 8 wherein the rotationally fixed component includes the friction surface engaging the sliding sleeve when the synchronizing device is disengaged with the first member.

10. The powertrain as set forth in claim 9 wherein the rotationally fixed component is a bearing block disposed axially adjacent the sliding sleeve.

11. The powertrain as set forth in claim 8 wherein the sliding sleeve includes the friction surface.

12. The powertrain as set forth in claim 11 wherein the rotationally fixed component is a bearing block disposed axially adjacent the sliding sleeve.

13. The powertrain as set forth in claim 8 wherein the rotationally fixed component is a shifting fork of the synchronizing device engaged with the sliding sleeve for sliding the sliding sleeve along the second member.

14. The powertrain as set forth in claim 13 wherein the shifting fork includes the friction surface.

15. The powertrain as set forth in claim 13 wherein the sliding sleeve includes the friction surface.

16. The powertrain as set forth in claim 13 further comprising a bearing block axially adjacent the sliding sleeve and rotationally fixed relative to the second member, a second friction surface being disposed between the bearing block and the sliding sleeve.

17. The powertrain as set forth in claim 16 wherein the bearing block includes the second friction surface.

18. The powertrain as set forth in claim 16 wherein the sliding sleeve includes the second friction surface.

19. The powertrain as set forth in claim 7 wherein the first member is a driving ring and the second member is a guiding sleeve.

* * * * *